US009198057B2

(12) United States Patent
Takano et al.

(10) Patent No.: US 9,198,057 B2
(45) Date of Patent: Nov. 24, 2015

(54) WIRELESS COMMUNICATION DEVICE, BASE STATION, WIRELESS COMMUNICATION METHOD, AND WIRELESS COMMUNICATION SYSTEM (75) Inventors: Hiroaki Takano, Saitama (JP); Kazuyuki Sakoda, Chiba (JP); Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 268 days.

(21) Appl. No.: 13/698,785

(22) PCT Filed: May 17, 2011

(86) PCT No.: PCT/JP2011/061255
§ 371 (c)(1),
(2), (4) Date: Jan. 14, 2013

(87) PCT Pub. No.: WO2011/148821
PCT Pub. Date: Dec. 1, 2011

(65) Prior Publication Data
US 2013/0130628 A1 May 23, 2013

(30) Foreign Application Priority Data
May 26, 2010 (JP) .................................. 2010-120634

(51) Int. Cl.
H04B 17/00 (2015.01)
H04W 24/02 (2009.01)
H04W 24/10 (2009.01)
H04W 8/26 (2009.01)
H04W 52/02 (2009.01)

(52) U.S. Cl.
CPC ............. *H04W 24/02* (2013.01); *H04W 24/10* (2013.01); *H04W 8/26* (2013.01); *H04W 52/0245* (2013.01)

(58) Field of Classification Search
CPC ..... H04W 24/00; H04W 24/02; H04W 24/04; H04W 24/08; H04W 8/245; H04W 88/02; H04W 64/00; H04W 88/06
USPC ..................... 455/67.11, 68, 418–420, 422.1, 455/435.1–435.3, 456.1, 517, 550.1, 561
See application file for complete search history.

(56) References Cited

U.S. PATENT DOCUMENTS

2008/0076449 A1* 3/2008 Joo ............................. 455/456.1
2012/0009936 A1* 1/2012 Ishii et al. ................... 455/456.1

FOREIGN PATENT DOCUMENTS

JP          2008-510421 A       4/2008
JP          2010-62783 A        3/2010
WO     WO 2008/101055 A2       8/2008

OTHER PUBLICATIONS

"3rd Generation Partnership Project; Technical Specification Group Services and System Aspects; Service requirements for Machine-Type Communications (MTC); Stage 1 (Release 10)", 3GPP TS 22.368 V10.0.0, Mar. 2010, pp. 3-25 with cover page.
Chinese Office Action issued Oct. 10, 2014, in Chinese Patent Application No. 201180024571.3 (with English translation).

* cited by examiner

*Primary Examiner* — Nhan Le
(74) *Attorney, Agent, or Firm* — Hazuki International, LLC (57) ABSTRACT Provided is a wireless communication device including a receiving unit for receiving information based on measurement of radio conditions transmitted from a base station in association with identification information; and a control unit for controlling communication by using the information received by the receiving unit when the wireless communication device corresponds to the identification information received by the receiving unit.

18 Claims, 9 Drawing Sheets

| Address | Data |
|---|---|
| Position 2 | Recommedation of Next eNodeB and Frequency |
| Position 5 | Recommedation of Next eNodeB and Frequency |

WIRELESS COMMUNICATION DEVICE, BASE STATION, WIRELESS COMMUNICATION METHOD, AND WIRELESS COMMUNICATION SYSTEM

TECHNICAL FIELD

The present disclosure relates to a wireless communication device, a base station, a wireless communication method, and a wireless communication system.

BACKGROUND ART

At present, the standardization of 4G wireless communication system is being carried out in 3GPP (Third Generation Partnership Project). The 4G makes it possible to use techniques such as a relay or carrier aggregation, thereby improving the maximum communication speed and the quality at cell edges. Further, it also has been studied to improve the coverage by introducing a base station other than eNodeB (macrocell base station), such as HeNodeB (Home eNodeB, femtocell base station, small base station for mobile phone) or RHH (Remote Radio Head).

In such a wireless communication system, user equipments perform a measurement of a reference signal included in a wireless signal transmitted from a base station to evaluate the quality of wireless communication. More specifically, the user equipment acquires measurement information by measuring multiple times and averaging values obtained from the measurements to suppress the influence of a fading. Then the user equipment reports the measurement information to the base station as needed. Further, technology related to the measurement is described, for example, in Patent Literature 1.

Meanwhile, there has been a discussion concerning the MTC (Machine Type Communications) in 3GPP. As an application of MTC, a variety of applications such as Metering for collecting information relevant to water systems or power systems, Health for collecting information relevant to health care instruments, or the like have been studied. The MTC terminal is a terminal designed specifically for these applications.

Furthermore, the MTC terminal, for example, has characteristics such as Low Mobility, Time Controlled, Online Small Data Transmission, and Time Tolerant. That is, the MTC terminal has a little movement, has a few connections to the base station to communicate a small amount of data, and then again returns to an idle mode. Further, some amount of delay is acceptable in data communication. Also, the MTC terminal requires extra low power consumption.

CITATION LIST

Patent Literature

Patent Literature 1: JP 2010-062783A

SUMMARY OF INVENTION

Technical Problem

However, measurements for obtaining measurement information are repeatedly performed multiple times as described above. Thus, if each one of all the MTC terminals performs a measurement, it would be difficult to achieve extra low power consumption.

Therefore, the present disclosure provides a novel and improved wireless communication device, base station, wireless communication method, and wireless communication system, capable of reducing power consumption of the wireless communication device such as a MTC terminal.

Solution to Problem

According to an embodiment of the present disclosure, there is provided a wireless communication device including a receiving unit for receiving information based on measurement of radio conditions transmitted from a base station in association with identification information, and a control unit for controlling communication by using the information received by the receiving unit when the wireless communication device corresponds to the identification information received by the receiving unit.

The identification information may be position information, and the wireless communication device corresponding to the identification information may be a wireless communication device located within a range specified by the identification information.

The information may be information obtained by the measurement of radio conditions within the range specified by the identification information.

The wireless communication device may further include a position information holding unit for holding position information, a measuring unit for measuring radio conditions, and a transmitting unit for transmitting radio condition measurement information obtained by the measuring unit to the base station in association with position information held by the position information holding unit. The control unit, when identification information corresponding to the wireless communication device is not received by the receiving unit, may cause the measuring unit to measure radio conditions.

Further, according to an embodiment of the present disclosure, there is provided a base station including a storage unit for storing identification information and the radio condition measurement information in association with each other, and a transmitting unit for transmitting the identification information and the radio condition measurement information in association with each other.

The identification information may be position information, and the identification information may be corresponded to a wireless communication device located within a range specified by the identification information.

The storage unit may further store acquisition time information of the radio condition measurement information in association with the identification information and the radio condition measurement information, and the transmitting unit may transmit the identification information and the radio condition measurement information when an elapsed time from acquisition time is within a predetermined range.

The base station may further include a control unit for designating at least one wireless communication device corresponding to the identification information as a recipient of requests for measurement of radio conditions and reporting of measurement information, and the storage unit may store radio condition measurement information reported from the wireless communication device designated as the recipient.

The control unit may designate two or more wireless communication devices as recipients of a same request for measurement of radio conditions and reporting of measurement information, and average measurement information reported from the two or more wireless communication devices.

The control unit may designate two or more wireless communication devices as recipients of requests for measurement of radio conditions and reporting of measurement information in different frequency bands, and integrate radio condition measurement information of the respective frequency bands reported from the two or more wireless communication devices.

The transmitting unit may transmit expiration information of the radio condition measurement information stored in the storage unit to a wireless communication device designated as a recipient of requests by the control unit.

The base station may further include a control unit for determining whether the plurality of wireless communication devices are to be changed over to a base station or frequency and determining to which base station or frequency the plurality of wireless communication devices are to be changed over. The transmitting unit, when it is determined by the control unit that the plurality of wireless communication devices are to be changed over to a base station or frequency, may transmit the base station or frequency determined to be changed over as radio condition measurement information in association with the identification information.

The transmitting unit may broadcast the identification information and the radio condition measurement information on a BCCH.

The transmitting unit may intermittently transmit the identification information and the radio condition measurement information by using a dedicated channel.

Further, according to an embodiment of the present disclosure, there is provided a wireless communication method including receiving, at a wireless communication device, information based on measurement of a radio condition transmitted from a base station in association with identification information, and controlling communication by using the received information when the wireless communication device corresponds to the received identification information.

Further, according to an embodiment of the present disclosure, there is provided a wireless communication method including storing identification information and the radio condition measurement information in association with each other, and transmitting the identification information and the radio condition measurement information in association with each other.

Further, according to an embodiment of the present disclosure, there is provided a wireless communication system including a base station including a storage unit for storing identification information and the radio condition measurement information in association with each other, and a transmitting unit for transmitting the identification information and the radio condition measurement information in association with each other, and a wireless communication device including a receiving unit for receiving information based on measurement of radio conditions transmitted from the base station in association with identification information, and a control unit for controlling communication by using the information received by the receiving unit when the wireless communication device corresponds to the identification information received by the receiving unit.

Advantageous Effects of Invention

According to the present disclosure as described above, the reduction of power consumption of a wireless communication device such as a MTC terminal can be done.

DESCRIPTION OF EMBODIMENTS

Hereinafter, preferred embodiments of the present technology will be described in detail with reference to the appended drawings. Note that, in this specification and the drawings, elements that have substantially the same function and structure are denoted with the same reference signs, and repeated explanation is omitted.

Also, in the specification and drawings, a plurality of structural elements having substantially the same functional configuration may be distinguished from each other by each having a different alphabetical letter added to the end of the same reference numeral. For example, a plurality of structural elements having substantially the same functional configuration may be distinguished from each other as necessary, such as MTC terminals 20A, 20B, and 20C. However, if it is not particularly necessary to distinguish each of a plurality of structural elements having substantially the same functional configuration, only the same reference numeral is assigned. For example, if it is not particularly necessary to distinguish between the MTC terminals 20A, 20B, and 20C, they are simply referred to as the MTC terminal 20.

Furthermore, "Description of Embodiments" will be described according to the following item order.

1. Overview of Wireless Communication System
1-1. Configuration of Wireless Communication System
1-2. Measurement
1-3. MTC Terminal
2. Configurations of MTC Terminal and eNodeB
3. Operations of MTC Terminal and eNodeB
4. Modified Example
4-1. Designation of MTC Terminal to perform Measurement
4-2. Method of transmitting Measurement Information from eNodeB 4-3. Modified Example of Method of transmitting from eNodeB 5. Conclusion

1. Overview of Wireless Communication System

At present, the standardization of 4G wireless communication system is being carried out in 3GPP. Embodiments of the present disclosure, as an illustrative example, are applicable to the 4G wireless communication system, and thus overview of 4G wireless communication system will be first described.

1-1. Configuration of Wireless Communication System

Figure 1:
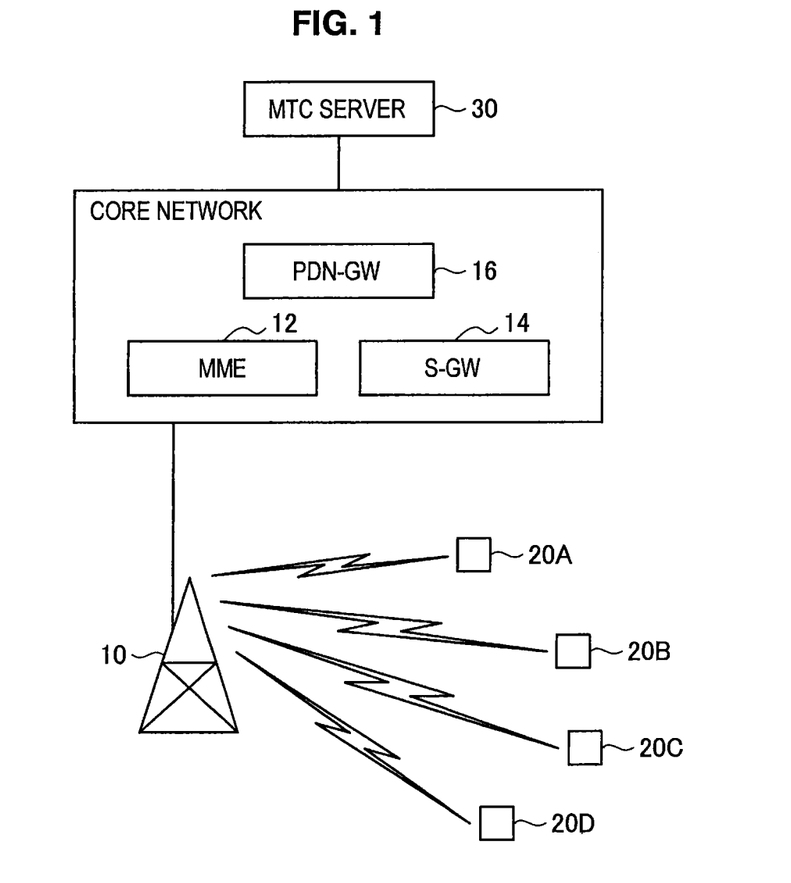
FIG. 1 is an explanatory diagram illustrating an exemplary configuration of a wireless communication system.

FIG. 1 is an explanatory diagram illustrating an exemplary configuration of a wireless communication system 1. As shown in FIG. 1, the wireless communication system 1 includes an eNodeB 10, a core network, MTC terminals 20, and a MTC server 30. The core network includes a MME (Mobility Management Entity) 12, an S-GW (Serving Gateway) 14, and a PDN (Packet Data Network)—GW 16.

The eNodeB 10 is a radio base station that communicates with the MTC terminal 20. Note that although only one eNodeB 10 is shown in FIG. 1, in practice a plurality of eNodeBs are connected to the core network. In addition, although the illustration is omitted in FIG. 1, the eNodeB 10 also communicates with wireless communication devices other than the MTC terminal 20, for example, a user equipment (UE: User Equipment). In the specification, the description is focused on the MTC terminal 20 as an example of a wireless communication device, but the present disclosure is also applicable to the user equipment.

Furthermore, although FIG. 1 illustrates the eNodeB 10 as an example of a base station, the present disclosure is also applicable to other base stations. For example, the present disclosure is also applicable to a relay node that relays communication between the user equipment (MTC terminal 20) and the eNodeB 10, and a base station such as Home eNodeB which is a small base station for home.

The MME 12 is a device that controls the setup, opening and handover of sessions for data communication. The MME 12 is connected to the eNodeB 10 through an interface called X2.

The S-GW 14 is a device that performs the routing, transfer, and so on, of user data. The PDN-GW 16 acts as a connection point to IP service network and transfers user data from and to the IP service network.

The MTC terminal 20 is a terminal designed specifically for applications for MTC which has been studied in 3GPP and performs a wireless communication with the eNodeB 10 depending on the applications. In addition, the MTC terminal 20 performs a bidirectional communication with the MTC server 30 through the core network. A user executes a particular application by accessing the MTC server 30. The user normally does not directly access the MTC terminal 20. This MTC terminal 20 will be described in detail in "1-3. MTC Terminal".

1-2. Measurement 4G measurement closely related to the embodiments of the present disclosure will be described below. Measurement is an operation performed in a user equipment to evaluate the quality of a wireless communication. The user equipment measures the reception quality using a reference signal or the like included in a signal transmitted from the eNodeB. In addition, the user equipment acquires measurement information by measuring the reference signal multiple times and averaging values obtained from the respective measurements so as to suppress the influence of a fading or the like.

Measured Object and Measurement Method

More specifically, the user equipment measures RSRP (Reference Signal Receive Power) or RSSI (Received Signal Strength Indicator) in a state synchronized with the eNodeB. The RSRP is a reception power of the reference signal transmitted from the eNodeB, and the RSSI is a reception power measured in a form that includes interference from a cell which is an interference source.

The user equipment then obtains RSRQ (Rference Signal Received Quality) based on the RSRP and RSSI. For example, the user equipment may obtain the RSRP from the mathematical expression of RSRP/RSSI. The user equipment determines cell reselection or handover based on this RSRP.

In this case, final measurement information is calculated by repeatedly measuring the RSRP multiple times and averaging the RSRP obtained by the respective measurements. Accordingly, the measurement requires a corresponding amount of time, and thus the user equipment spends a large power for the measurement. Therefore, there is a need to suppress unnecessary measurement so as to reduce power consumption in the user equipment.

Further, the user equipment reports the measurement information to the eNodeB periodically or when a trigger condition which is the quality relationship between a Serving eNodeB and a new eNodeB is satisfied. In addition, the user equipment does not report the measurement information in an idel mode and reflects it in the operation of the terminal.

Case where Measurement is Performed

Measurement in the user equipment is performed in the following cases.

- Case where the determination of an eNodeB to be connected is needed after the user equipment is powered on (initial access).
- Case where the quality of the eNodeB is monitored during the connection (in order to determine the beginning of cell search).
- Case where the quality of an eNodeB in other frequencies or neighboring cells is needed, if the quality of the eNodeB is decreased during the connection (in order to determine handover).
- In an idle mode, a case where the quality of the eNodeB receiving a paging is monitored. A paging channel is received at fixed intervals in an idle mode. In the paging channel, each of a plurality of eNodeBs in a tracking area transmits the same signal, but the user equipment receives a signal transmitted from one eNodeB of the plurality of eNodeBs (in order to determine the beginning of cell search in the idle mode).
- In an idle mode, if the quality of the eNodeB which is receiving a paging is decreased, a case where a candidate of the eNodeB for receiving a new paging channel is searched (in order to change over the eNodeB for receiving a paging).

Summary of Measurement

Main points of the above-mentioned measurement are summarized below.

- There are multiple types of cases that the measurement is performed.
- The measurement is performed by a user equipment.
- The measurement information may be reported to the eNodeB or may not be reported to the eNodeB. If the measurement information is reported to the eNodeB, the measurement information may be reported periodically or under certain trigger conditions.
- The measurement is performed multiple times to obtain an average value, and thus the power of the user equipment is consumed.

1-3. MTC Terminal

The MTC terminal 20 is a terminal designed specifically for applications for MTC which has been studied in 3GPP, as described above. Examples of the applications for MTC are as follows:

1. Security
2. Tracking & Tracing
3. Payment
4. Health
5. Remote Maintenance/Control
6. Metering
7. Consumer Devices As an example, the MTC terminal 20 may be an electrocardiogram measuring device corresponding to "4. Health" in the list above. In this case, if a user inputs a command for requesting the MTC server 30 to report electrocardiogram measurements, the MTC server 30 requests the MTC terminal 20 to report the electrocardiogram measurements, and then the electrocardiogram measurements are reported from the MTC terminal 20 to the MTC server 30.

As another example, the MTC terminal 20 may be a vending machine corresponding to "3. Payment" in the list above. In this case, if a user inputs a command for requesting the MTC server 30 to report the sales volume, the MTC server 30 requests the MTC terminal 20 to report the sales volume, and then the sales volume is reported from the MTC terminal 20 to the MTC server 30.

The characteristics of such MTC terminal 20 are described below. In addition, the MTC terminal 20 is not necessary to have all of the characteristics described below.

1. Low Mobility
2. Time Controlled
3. Time Tolerant
4. Packet Switched Only
5. Online Small Data Transmissions
6. Offline Small Data Transmission
7. Mobile Originated Only
8. Infrequent Mobile Terminated
9. MTC Monitoring
10. Offline Indication
11. Jamming Indication
12. Priority Alarm Message
13. Extra Low Power Consumption
14. Secure Connection
15. Location Specific Trigger
16. Group based MTC Features Summarizing the above, the MTC terminal 20 has a little movement, has a few connections to the eNodeB to communicate a small amount of data, and then again returns to an idle mode. Further, some amount of delay is acceptable in data communication. In addition, the MTC terminal 20 requires extra low power consumption (13. Extra Low Power Consumption).

In this regard, the number of the MTC terminals 20 to be used in the future is expected. At present, nearly two billion and seven hundred million people out of the world's population of more than six billion people are using cellular phones. On the other hand, in the situation that there are nearly five hundred trillion machines in the world, nearly five hundred million machines are using cellular phones as the MTC terminal 20.

That is, although the MTC terminals 20 are not yet widely used at present, on the order of one hundred trillion MTC terminals 20 would be more likely to be accommodated in the cellular phones all over the world in the future. Consequently, it is expected that an expanded number of MTC terminals 20 would be accommodated in each eNodeB 10.

Why Embodiments of the Present Disclosure are Conceived

As described in the item "1-3. MTC Terminal", the MTC terminal 20 requires extra low power consumption. However, if the measurement performed by the user equipment described in the item "1-2. Measurement" is directly applied to the MTC terminal 20, there is a problem that it is difficult to achieve extra low power consumption.

As described in the item "1-3. MTC terminal", it is expected that an expanded number of MTC terminals 20 would be accommodated in each eNodeB 10 in the future. Thus, it is desired to reduce signaling between the eNodeB and the MTC terminal 20.

Moreover, a measurement result is varied depending on external factors such as an interference suppression control by other mobile objects or eNodeBs even in the same location, thus it is necessary to update measurement information.

Therefore, the embodiments of the present disclosure have been designed by considering the above-mentioned circumstances as a problem to be solved. According to the embodiments of the present disclosure, it is possible to reduce power consumption of the MTC terminal 20, suppress signaling between the MTC terminal 20 and the eNodeB 10, and update measurement information of the MTC terminal 20. The eNodeB 10 and the MTC terminal 20 according to the embodiments of the present disclosure will be described in detail below.

2. Configurations of MTC Terminal and eNodeB

Configuration of MTC Terminal

Figure 2:
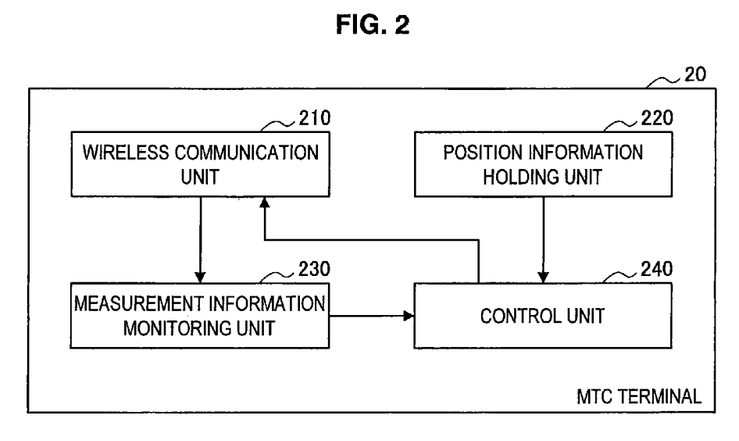
FIG. 2 is a functional block diagram illustrating a configuration of a MTC terminal according to an embodiment of the present disclosure.

FIG. 2 is a functional block diagram illustrating the configuration of the MTC terminal 20 according to the embodiment of the present disclosure. As shown in FIG. 2, the MTC terminal 20 includes a wireless communication unit 210, a position information holding unit 220, a measurement information monitoring unit 230, and a control unit 240.

The wireless communication unit 210 has a function as a receiving unit for receiving a control signal, data, measurement information, and so on from the eNodeB 10 and a function as a transmitting unit for transmitting a control signal, data, measurement information, and so on to the eNodeB 10. Specifically, the wireless communication unit 210 performs a wireless signal processing and an antenna signal processing such as modulation or demodulation, and a mapping, de-mapping or interleaving of signals. In addition, the wireless communication unit 210 has also a function as a measuring unit that measures radio conditions.

The position information holding unit 220 holds position information that indicates a current position of the MTC terminal 20. The MTC terminal 20 may acquire position information by using a GPS, and may acquire position information obtained by estimation in the eNodeB 10.

The measurement information monitoring unit 230 monitors signals received from the eNodeB 10 by the wireless communication unit 210, and extracts measurement information corresponding to the MTC terminal 20 from signals received from the eNodeB 10.

Specifically, the eNodeB 10 according to the embodiment of the present disclosure broadcasts measurement information in association with position information. Thus, when a current position of the MTC terminal 20 is within a range specified by the position information transmitted from the eNodeB 10, the measurement information monitoring unit 230 extracts the measurement information transmitted in association with the position information.

In addition, the position information transmitted from the eNodeB 10 may be latitude and longitude information that indicates a given point, and the range specified by the position information may be a range within a predetermined distance from the point indicated by the position information. Alternatively, the position information transmitted from the eNodeB 10 may be information that indicates a given range, and the range specified by the position information may be a range indicated by the position information. Here, it is assumed that a plurality of the MTC terminals 20 exist in the range specified by the position information, thus the plurality of MTC terminals 20 are corresponding to the position information transmitted from the eNodeB 10.

In this way, in the embodiment of the present disclosure, although the position information is used as identification information for identifying a specific MTC terminal 20, the identification information is not limited to position information. For example, when a plurality of MTC terminals 20 are grouped and group ID is assigned to the respective groups, the group ID can also be used as identification information. In this case, the measurement information monitoring unit 230 of the MTC terminal 20 extracts measurement information based on whether the group ID transmitted in association with the measurement information from the eNodeB 10 is a group ID of a group to which the MTC terminal 20 belongs.

The control unit 240 controls the overall operation of the MTC terminal 20. For example, the control unit 240 performs determination of whether or not measurement is performed, a process related to a series of measurements, a communication control based on measurement information, and so on. When the measurement information corresponding to the MTC terminal 20 is extracted by the measurement information monitoring unit 230, the control unit 240 avoids the need for performing measurement by using the measurement information. In addition, when measurement is performed, the control unit 240 transmits the measurement information along with the position information held in the position information holding unit 220 to the eNodeB 10.

In addition, the control unit 240 may be incorporated with a portion of the measurement method performed by the user equipment described in the item "1-2. Measurement". For example, the control unit 240 may measure RSRP and RSSI, and obtain RSRP from the RSRP and RSSI.

Configuration of eNodeB

Figure 3:
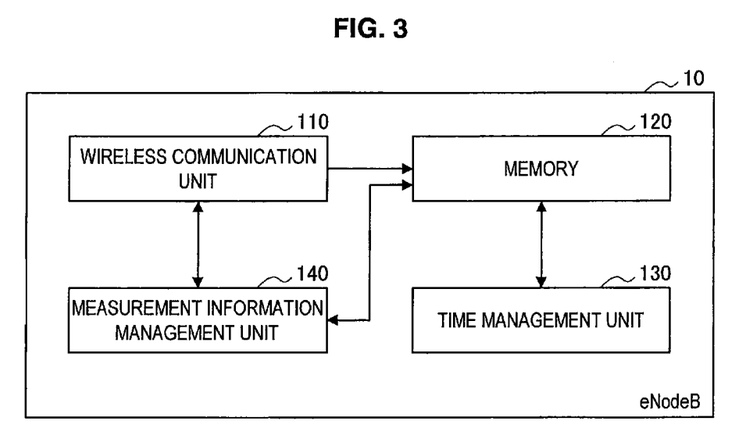
FIG. 3 is an explanatory diagram illustrating a configuration of an eNodeB according to an embodiment of the present disclosure.

FIG. 3 is an explanatory diagram illustrating the configuration of the eNodeB 10 according to the embodiment of the present disclosure. As shown in FIG. 3, the eNodeB 10 includes a wireless communication unit 110, a memory 120, a time management unit 130, and a measurement information management unit 140.

The wireless communication unit 110 has a function as a receiving unit for receiving a control signal, data, measurement information, and so on from the MTC terminal 20 and a function as a transmitting unit for transmitting a control signal, data, measurement information, and so on to the MTC terminal 20. Specifically, the wireless communication unit 110 performs a wireless signal processing and an antenna signal processing such as modulation or demodulation, and a mapping, de-mapping or interleaving of signals.

The memory 120 is a storage unit for storing position information, measurement information, and acquisition time information of the measurement information in association with one another. For example, the memory 120 holds position information of a given MTC terminal 20 received from the MTC terminal 20 and measurement information measured by the MTC terminal 20 in association with each other. Further, the measurement information held in the memory 120 may be measurement information obtained by measurement in any wireless communication device other than the MTC terminal 20. A specific example of information stored in the memory 120 will be described below with reference to FIG. 4.

Figure 4:
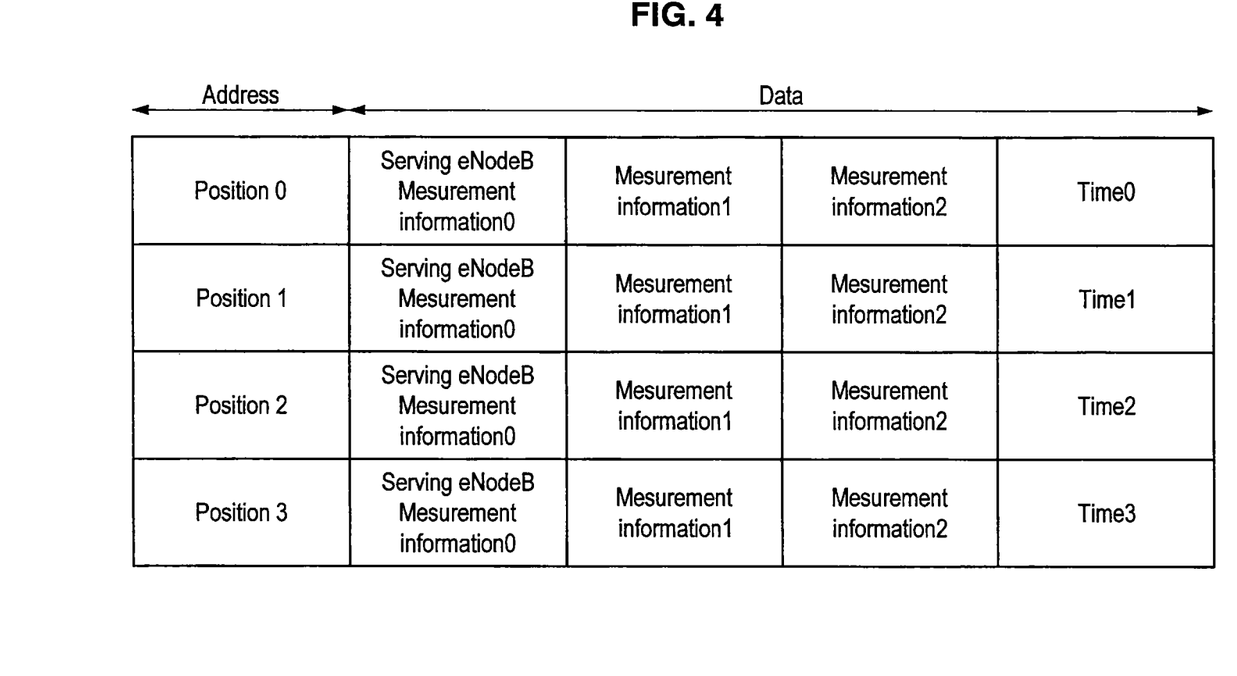
FIG. 4 is an explanatory diagram illustrating a specific example of information stored in a memory.

FIG. 4 is an explanatory diagram illustrating a specific example of information stored in the memory 120. As shown in FIG. 4, measurement information stored in association with position information (Position N) and acquisition time information (Time M) includes not only information on a Serving eNodeB connected to the MTC terminal 20 which performs measurement but also information on other eNodeBs.

For example, the measurement information associated with position information Position 0 includes measurement information 0 related to a Serving eNodeB, and measurement information 1 and 2 related to other eNodeBs or frequencies. Further, the acquisition time indicated by acquisition time information (Time M) may be the time at which the eNodeB 10 receives measurement information from the MTC terminal 20, the time at which measurement information is stored in the memory 120, or the time at which the MTC terminal 20 acquires measurement information.

The time management unit 130 manages a current time, an elapsed time from the time indicated by each piece of acquisition time information stored in the memory 120, and so on.

The measurement information management unit 140 (control unit) manages transmission of measurement information held in the memory 120. For example, the measurement information management unit 140 controls so that measurement information and position information held in the memory 120 may be transmitted on the BCCH (broadcast channel).

With this configuration, the MTC terminal 20 which receives measurement information corresponding to the current position can avoid the need for performing measurement by using the measurement information. As a result, it is possible to reduce power consumption of the MTC terminal 20. In addition, the MTC terminal 20 may not transmit measurement information to the eNodeB 10, thus it is possible to suppress signaling of measurement information from the MTC terminal 20 to the eNodeB 10.

Figure 5:
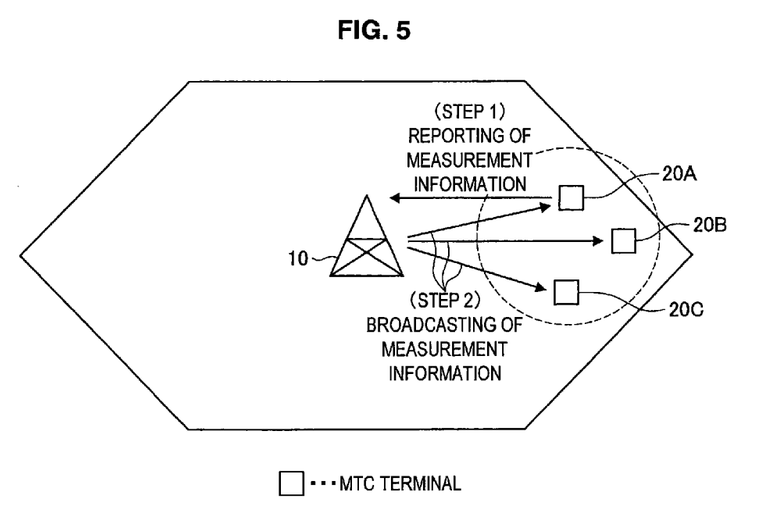
FIG. 5 is an explanatory diagram illustrating how a plurality of MTC terminals share measurement information.

For example, as shown in FIG. 5, if a MTC terminal 20A performs measurement and reports measurement information to an eNodeB 10 (step 1), the eNodeB 10 broadcasts the measurement information (step 2). Thus, MTC terminals 20B and 20C existed in the vicinity of the MTC terminal 20A can avoid the need for performing measurement by using the broadcasted measurement information, that is, by sharing measurement information with the MTC terminal 20A. Therefore, the power consumption of the MTC terminal 20B and 20C can be reduced. In addition, the MTC terminals 20B and 20C may not transmit measurement information to the eNodeB 10, thus it is possible to suppress signaling of measurement information from the MTC terminal 20 to the eNodeB 10.

Furthermore, the measurement information management unit 140 may not transmit the measurement information in which an elapsed time from the acquisition time is outside of a predetermined range based on the acquisition time information associated with each piece of measurement information. Alternatively, the measurement information management unit 140 may control so that acquisition time information is transmitted along with the measurement information on the BCCH. In this case, the MTC terminal 20 which extracts the measurement information having the acquisition time earlier than others performs the measurement on behalf of neighboring MTC terminals and reports new measurement information to the eNodeB 10. With this configuration, it can be prevented that the measurement is performed by all of the MTC terminals around the MTC terminal 20. In addition, it also can be prevented that the measurement information becomes expired.

3. Operations of MTC Terminal and eNodeB

The configurations of the MTC terminal 20 and the eNodeB 10 according to the embodiment of the present disclosure have been described above. Next, the operations of the MTC terminal 20 and the eNodeB 10 according to the embodiment of the present disclosure will be described.

Operation of eNodeB

Figure 6:
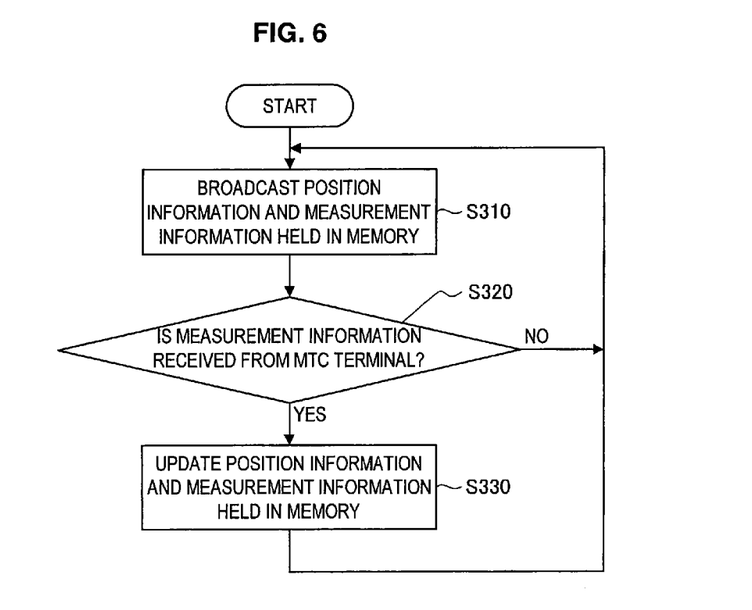
FIG. 6 is a flowchart showing an operation of an eNodeB according to an embodiment of the present disclosure.

FIG. 6 is a flowchart showing the operation of the eNodeB 10 according to the embodiment of the present disclosure. As shown in FIG. 6, the eNodeB 10 broadcasts position information and measurement information held in the memory 120 in association with each other (S310).

Then, when the eNodeB 10 receives position information and measurement information from the MTC terminal 20 (S320), the eNodeB 10 updates information held in the memory 120 with the received position information and measurement information (S330). For example, the eNodeB 10 retrieves the received position information and the position information that indicates a position within the predetermined range from the memory 120, and rewrites the measurement information associated with the retrieved position information to the received measurement information.

Operation of MTC Terminal

Figure 7:
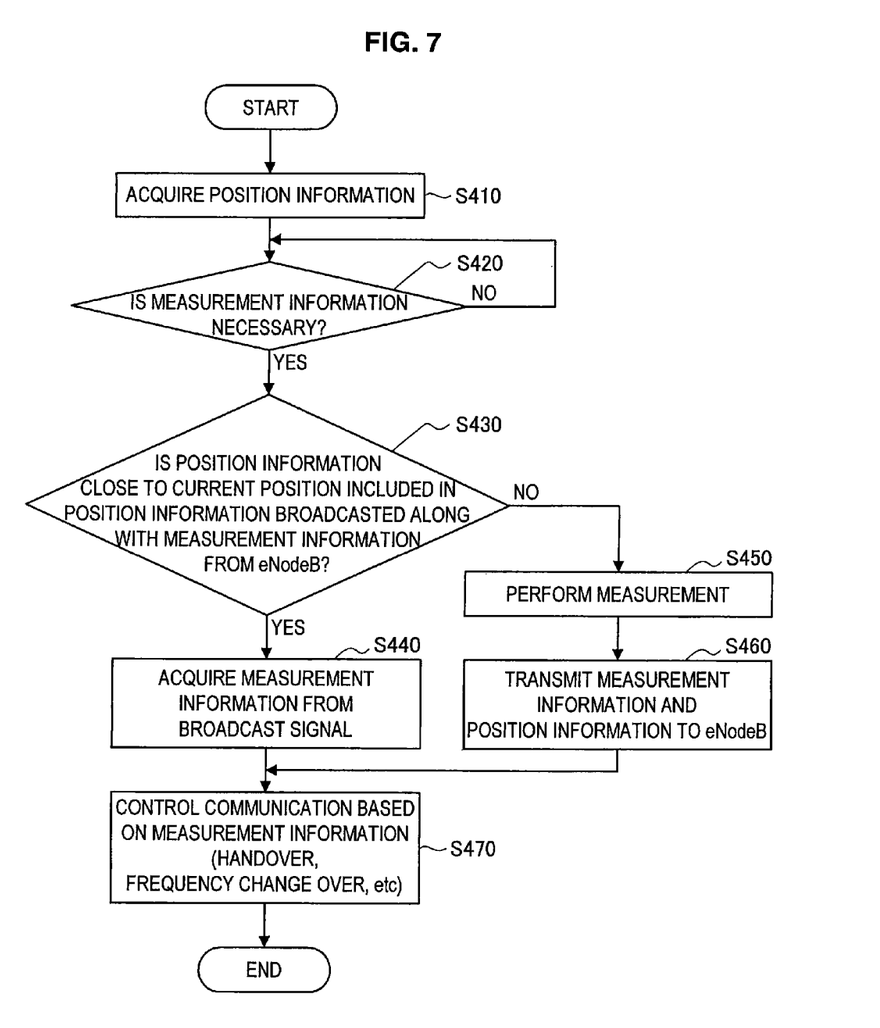
FIG. 7 is a flowchart showing an operation of a MTC terminal according to an embodiment of the present disclosure.

FIG. 7 is a flowchart showing an operation of the MTC terminal 20 according to the embodiment of the present disclosure. As shown in FIG. 7, the MTC terminal 20 first acquires its own position information (S410). Then, the MTC terminal 20, when measurement information is required (S420), determines whether position information close to its own current location indicated by the position information acquired in S410 is included in the position information broadcasted along with measurement information from the eNodeB 10 (S430).

Moreover, examples of the case in which the measurement information is needed include when it is determined that MTC terminal 20 is connected to which eNodeB after the MTC terminal 20 is powered on, when the quality of the eNodeB 10 is monitored during the connection, and when the quality of other frequencies or neighboring cells is needed.

When it is determined that the position information corresponding to the MTC terminal 20 is included in the broadcast signal in S430, the MTC terminal 20 acquires measurement information associated with the above-mentioned position information from the broadcast signal (S440). On the other hand, if the position information corresponding to the MTC terminal 20 is not included in the broadcast signal, then the MTC terminal 20 performs measurement (S450), and transmits the measurement information and the position information indicating a current position to the eNodeB 10 (S460).

The MTC terminal 20, after acquiring the measurement information in S440 or S460, controls the communication using the acquired measurement information (S470). For example, the MTC terminal 20 controls handover, frequency change over or the like, when there are an eNodeB 10 or frequency having better quality than an eNodeB 10 or frequency which is currently being used, on the basis of the acquired measurement information.

As described above, the MTC terminal 20 can suppress the number of times required to perform measurement by using measurement information broadcasted from the eNodeB 10, thereby reducing power consumption.

It should be noted that the above-mentioned method is a way how a plurality of MTC terminals 20 located in the vicinity share the same measurement information. In this regard, if its position is varied even a little, actual radio conditions are changed accordingly. Thus, the accuracy of measurement information being shared by the plurality of MTC terminal 20 would be not perfect. However, the MTC terminal 20 is assumed to perform a low-speed communication at a low frequency. For this reason, it is considered that a modulation method to be used becomes a modulation method with a low data rate such as QPSK. Therefore, even if the measurement information with a low accuracy is used, it may be said that actual operational problems are restrictive.

4. Modified Example

The basic configuration according to the embodiment of the present disclosure has been described above. Next, a modified example of the embodiment of the present disclosure will be described.

4-1. Designation of MTC Terminal to Perform Measurement

In the description described above, the example of determining whether or not the MTC terminal 20 performs measurement has been described. As a modified example, the eNodeB 10 may designate a recipient of requests for performing measurement and reporting of measurement information. A specific example in which the eNodeB 10 designates a recipient of requests for performing measurement and reporting of measurement information will be described below.

Figure 8:
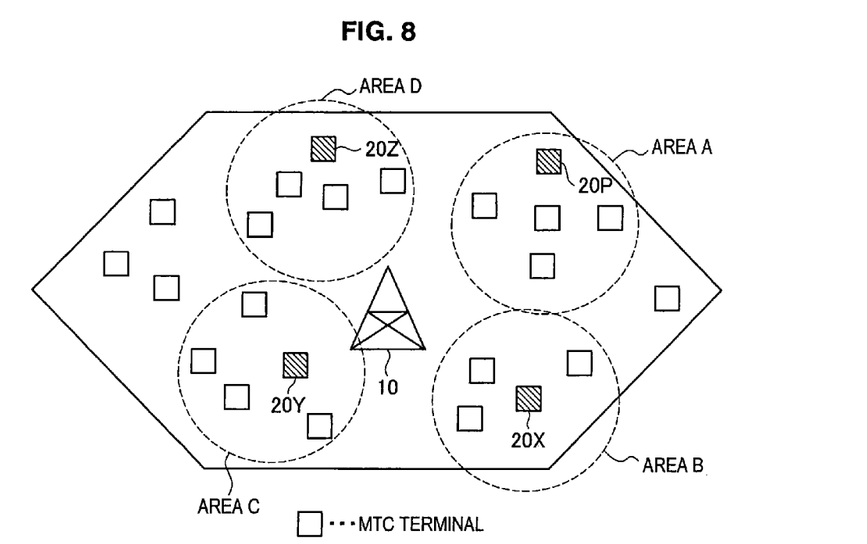
FIG. 8 is an explanatory diagram illustrating a specific example in which an eNodeB designates a recipient of requests for performing measurement and reporting of measurement information.

FIG. 8 is an explanatory diagram illustrating a specific example in which the eNodeB designates a recipient of requests for performing measurement and reporting of measurement information. As shown in FIG. 8, when a plurality of MTC terminals 20 is included in each of areas A to D, the measurement information management unit 140 of the eNodeB 10 requests the MTC terminals 20 in each area to perform measurement and report measurement information.

For example, as shown in FIG. 8, the measurement information management unit 140 of the eNodeB 10 designates a MTC 20P of the plurality of MTC terminals 20 located in the area A as a recipient of requests for performing measurement and reporting of measurement information. With this configuration, the measurement information is reported from the MTC 20P to the eNodeB 10, and thus it is possible to cause the multiple MTC terminals 20 in the area A to share the measurement information of the MTC 20P by broadcasting the measurement information.

Further, the measurement information management unit 140 of the eNodeB 10 may designate two or more MTC terminals 20 of the plurality of MTC terminals 20 located in the same area as a recipient of requests for performing measurement and reporting of measurement information.

For example, if one thousand MTC terminals 20 are located in the area A, performing measurement and reporting of measurement information may be requested to ten MTC terminals 20 in the area A. In a case where performing measurement and reporting of measurement information are requested to only one MTC terminal 20 in the area, if this MTC terminal 20 fails to perform measurement, then all of the MTC terminals 20 in the area will not acquire measurement information. On the other hand, If two or more MTC terminals 20 in the area are designated as a recipient of requests for performing measurement and reporting of measurement information as described above, then it is possible to reduce the adverse effects occurred in the case where the MTC terminal 20 which is a recipient of the requests fails to perform the measurement.

Furthermore, the eNodeB 10 can designate one or more MTC terminals 20 in each area as the recipient of a request for measurement as described above by collecting position information of each MTC terminal 20 and grouping the MTC terminals 20 located in the substantially same position.

Distribution of Measured Object

In addition, the eNodeB 10, when requesting two or more MTC terminals 20 to perform measurement, may distribute the measured object such as a frequency band to two or more MTC terminals 20 and integrate the measurement information reported from the two or more MTC terminals 20. The specific example will be described below.

Figure 9:
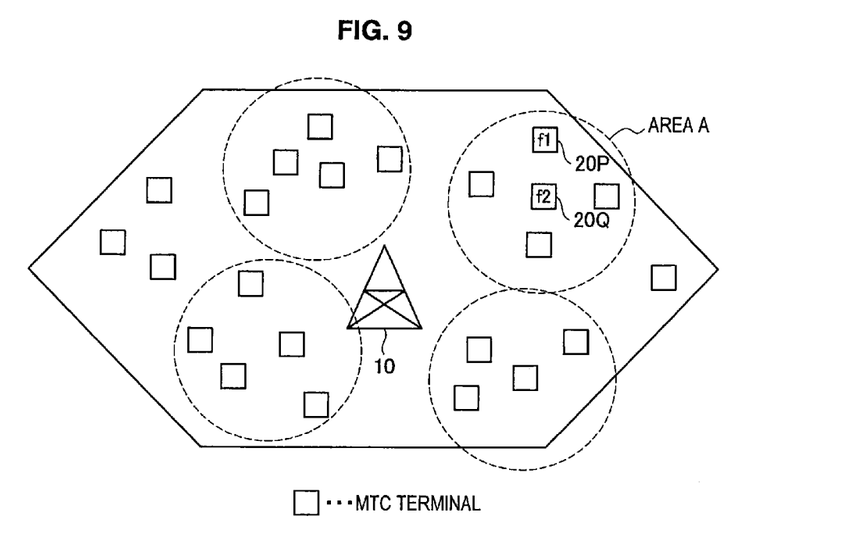
FIG. 9 is an explanatory diagram illustrating a specific example in which the objects to be measured are distributed to a plurality of MTC terminals.

FIG. 9 is an explanatory diagram illustrating a specific example of distributing the measured object to a plurality of MTC terminals 20. As shown in FIG. 9, when the eNodeB 10 requests MTC terminals 20P and 20Q in the area A to perform measurement, the eNodeB 10 may request the MTC terminal 20P to perform the measurement of a frequency band f1, and request the MTC terminal 20Q to perform the measurement of a frequency band f2.

In this case, measurement information related to the frequency band f1 is reported from the MTC terminal 20P, and measurement information related to the frequency band f2 is reported from the MTC terminal 20Q. Thus, the eNodeB 10 acquires final measurement information by integrating measurement information reported from the MTC terminals 20P and 20Q.

With this configuration, the load due to measurement can be distributed to two or more MTC terminals 20, thereby reducing power consumption caused by one MTC terminal 20.

Averaging of Measurement Information

A normal measurement process, as described in the item "1-2. Measurement", performs measurement in one terminal multiple times, and acquires measurement information by averaging values obtained by each measurement. Thus, the time taken to perform multiple measurements until completing the measurement process is required.

Therefore, the eNodeB 10, when requesting two or more MTC terminals 20 to perform measurement, may acquire the final measurement information by reducing the number of measurement times performed in each MTC terminal 20 and averaging measurement information reported from each MTC terminal 20. The specific example will be described below.

Figure 10:
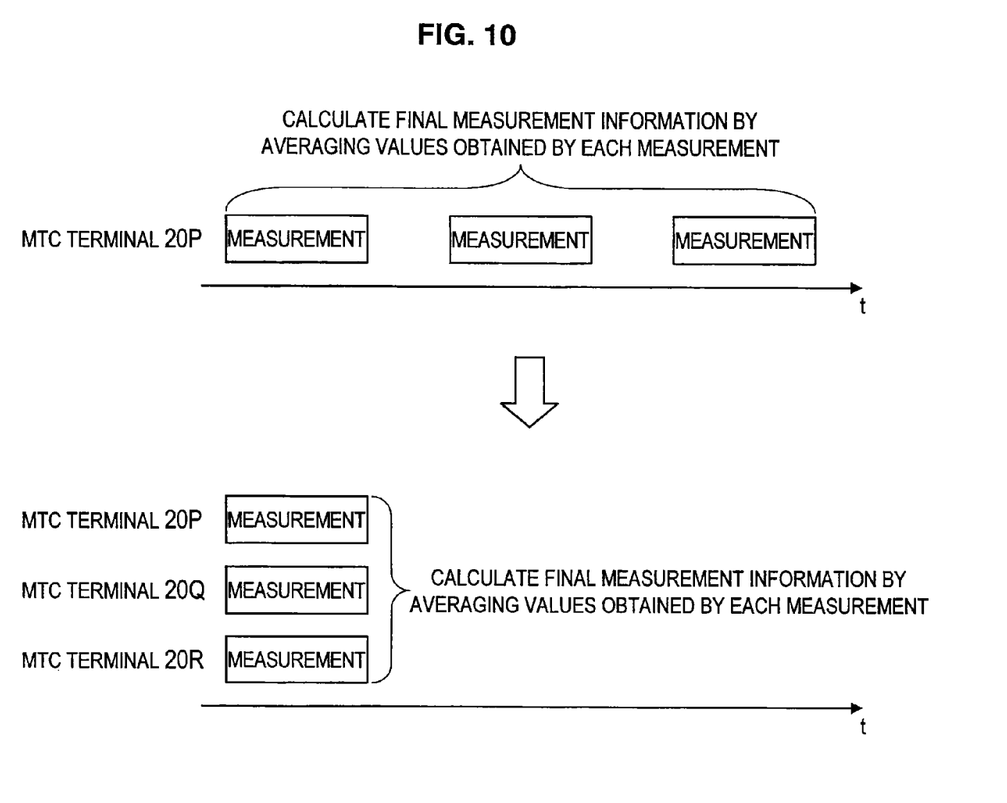
FIG. 10 is an explanatory diagram illustrating a specific example of reducing the number of measurement times in each MTC terminal.

FIG. 10 is an explanatory diagram illustrating a specific example of reducing the number of measurement times in each MTC terminal 20. As shown in the upper portion of FIG. 10, normally one MTC terminal 20 performs measurement multiple times and averages values obtained by each measurement, and thus final measurement information is calculated.

Meanwhile, as shown in the lower portion of FIG. 10 as a modified example, in the eNodeB 10, the final measurement information may be calculated by causing the number of measurement times performed by two or more MTC terminals 20P to 20Q designated as a recipient of requests to be less than usual and averaging values obtained from the MTC terminals 20P to 20Q.

With this configuration, the number of measurement times in the MTC terminal 20 designated as a recipient of requests is reduced, and thus the time required for the eNodeB 10 to acquire the final measurement information can be reduced. In addition, it is also possible to reduce power consumption in each MTC terminal 20.

4-2. Method of Transmitting Measurement Information from eNodeB

Although the example in which the eNodeB 10 broadcasts measurement information on the BCCH has been described above, embodiments of the present disclosure are not limited to this example. For example, as described with reference to FIG. 11, the eNodeB 10 may transmit measurement information using a dedicated channel.

Figure 11:
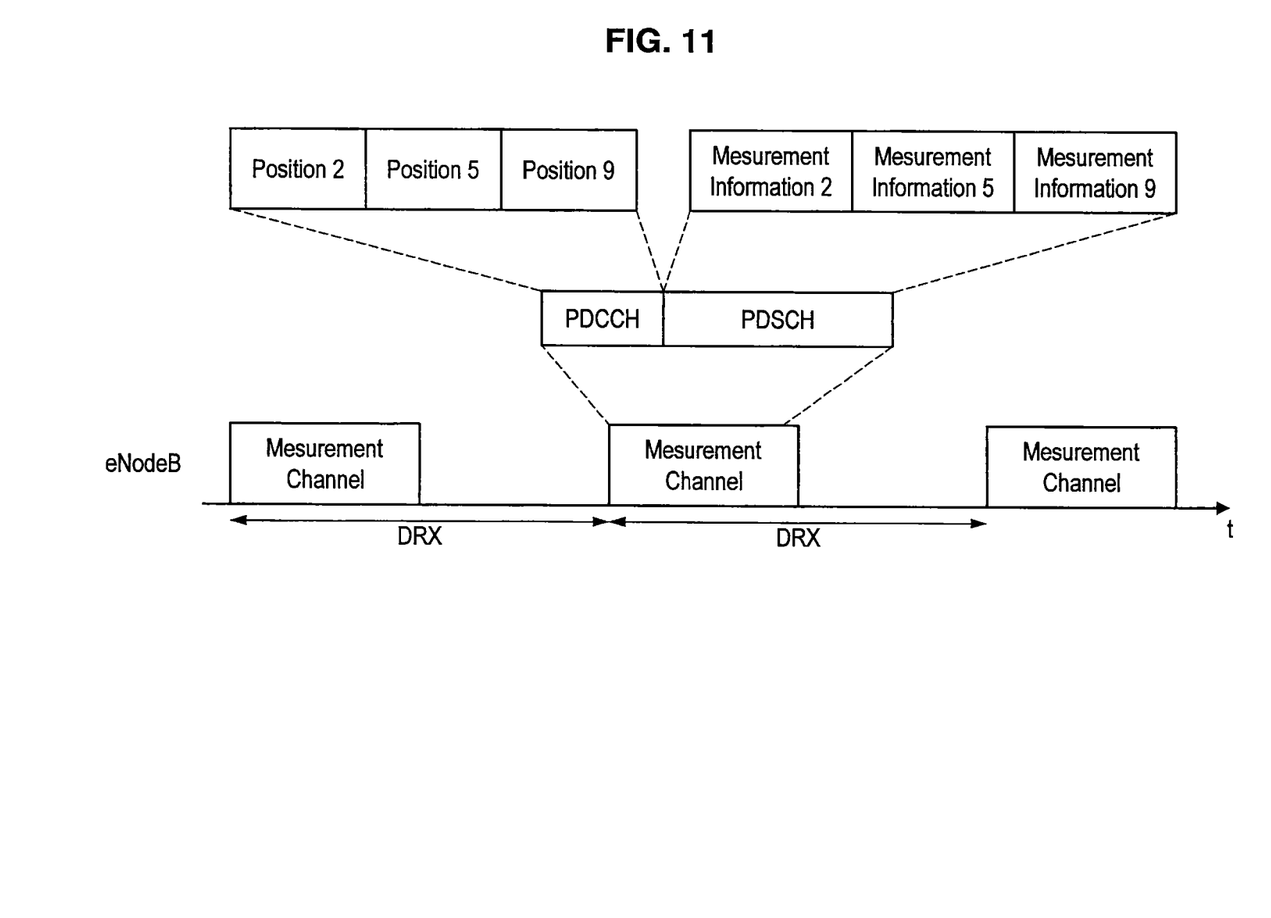
FIG. 11 is an explanatory diagram illustrating an exemplary configuration of a measurement channel for transmitting measurement information.

FIG. 11 is an explanatory diagram illustrating an exemplary configuration of a measurement channel for transmitting measurement information. The eNodeB 10, as shown in FIG. 11, transmits the measurement channel at a DRX (Discontinues Reception) interval.

This measurement channel, as shown in FIG. 11, consists of PDCCH and PDSCH. The PDSCH includes measurement information, and PDCCH includes position information corresponding to measurement information included in the PDSCH.

Therefore, the MTC terminal 20 intermittently receives the measurement channel, and thus it is possible to extract the measurement information from the PDSCH only when the position information corresponding to the MTC terminal 20 is not included in the PDCCH.

4-3. Modified Example of Method of Transmitting from eNodeB

Although the example in which the eNodeB 10 transmits measurement information has been described above, embodiments of the present disclosure are not limited to this example. For example, the eNodeB 10 may transmit an eNodeB, frequency, or the like to be changed over, instead of measurement information, to the MTC terminal 20, when the MTC terminal 20 needs to change over to a different eNodeB 10 or frequency.

Specifically, the measurement information management unit 140 of the eNodeB 10 determines a position where the MTC terminal 20 to be changed over into a different eNodeB 10 or frequency is located, on the basis of the measurement information stored in the memory 120. For example, when measurement information better than measurement information of a Serving eNodeB is associated with certain position information, the measurement information management unit 140 of the eNodeB 10 extracts an eNodeB or frequency band which provides the position information and the better measurement information.

Figure 12:
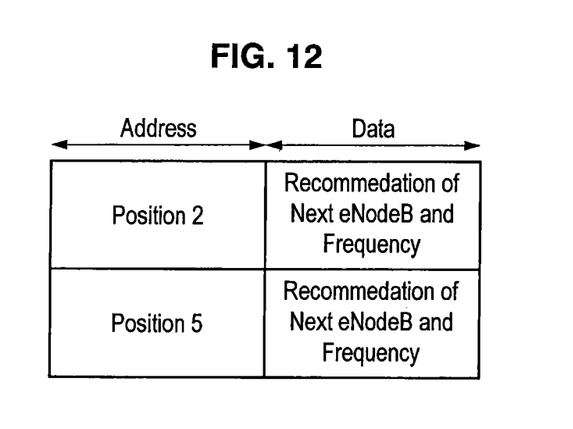
FIG. 12 is an explanatory diagram illustrating a modified example of information transmitted by an eNodeB.

Then, the wireless communication unit 110 of the eNodeB 10, as shown in FIG. 12, transmits the position information and an eNodeB or frequency band (Recommendation of Next eNodeB and Frequency) extracted by the measurement information management unit 140. In this case, the MTC terminal 20 extracts information indicating the eNodeB or frequency band associated with the position information corresponding to the MTC terminal 20, and uses the extracted eNodeB or frequency band. With this configuration, it is possible to suppress the amount of information transmitted from the eNodeB 10.

5. Conclusion

As described above, according to the embodiments of the present disclosure, the MTC terminal 20 which receives measurement information corresponding to current position can avoid the need for performing measurement by using the measurement information. Therefore, it is possible to reduce power consumption of the MTC terminal 20. In addition, because the MTC terminal 20 may not transmit the measurement information to the eNodeB 10, it is possible to suppress signaling of measurement information from the MTC terminal 20 to the eNodeB 10, and to prevent loss of throughput in a normal communication.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

For example, each step in the process of the eNodeB 10 or the MTC terminal 20 of the present specification do not necessarily have to be processed in a time series according to the order described as the sequence diagrams or flowcharts. For example, each step in the process of the eNodeB 10 or MTC terminal 20 may be processed in an order different from the order described as flowcharts, or may be processed in parallel.

Furthermore, a computer program for causing hardware such as CPU, ROM and RAM, embedded in the eNodeB 10 or the MTC terminal 20 to realize an equivalent function as each element of the above-mentioned eNodeB 10 or MTC terminal 20 can also be created. Moreover, a storage medium having the computer program stored thereon is also provided.

REFERENCE SIGNS LIST 10 eNodeB
12 MME
14 S-GW
16 PDN-GW
10 20 MTC terminal
30 MTC server
110, 210 Wireless communication unit
120 Memory
130 Time management unit
140 Measurement information management unit
220 Position information holding unit
230 Measurement information monitoring unit
240 Control unit

The invention claimed is:

1. A wireless communication device comprising:
circuitry configured to:
receive measurement information, which is based on measurement of a radio condition of a transmission from a base station, in association with identification information;
receive expiration information of the radio condition measurement information from the base station; and
control communication based on the received measurement information and the received expiration information, when the wireless communication device corresponds to the received identification information.

2. The wireless communication device according to claim 1,
wherein the identification information is position information, and
wherein the wireless communication device corresponding to the identification information is a wireless communication device located within a range specified by the identification information.

3. The wireless communication device according to claim 2,
wherein the measurement information is obtained by the measurement of radio conditions within the range specified by the identification information.

4. The wireless communication device according to claim 3, further comprising:
memory configured to store position information, wherein the circuitry is further configured to:
measure radio conditions to generate radio condition measurement information; and
transmit the radio condition measurement information to the base station in association with the position information stored in the memory, when the identification information does not correspond to the wireless communication device to measure the radio conditions.

5. A base station comprising:
memory configured to:
store identification information and radio condition measurement information in association with each other, and
store expiration information of the radio condition measurement information; and
circuitry configured to:
transmit, to a wireless communication device, the identification information and the radio condition measurement information in association with each other, and
transmit, to the wireless communication device, the expiration information of the radio condition measurement,
wherein the wireless communication device controls communication based on the radio condition measurement information and the expiration information, when the wireless communication device corresponds to the identification information.

6. The base station according to claim 5, wherein the identification information is position information, and
wherein the wireless communication device corresponds to the identification information when the wireless communication device is located within a range specified by the identification information.

7. The base station according to claim 6,
wherein the memory further stores acquisition time information of the radio condition measurement information in association with the identification information and the radio condition measurement information, and
wherein the circuitry transmits the identification information and the radio condition measurement information when an elapsed time from acquisition time is within a predetermined range.

8. The base station according to claim 6,
wherein the circuitry is configured to designate at least one wireless communication device corresponding to the identification information as a recipient of requests for measurement of radio conditions and reporting of measurement information, and
wherein the memory stores radio condition measurement information reported from the wireless communication device designated as the recipient.

9. The base station according to claim 8, wherein the circuitry designates two or more wireless communication devices as recipients of a same request for measurement of radio conditions and reporting of measurement information, and averages measurement information reported from the two or more wireless communication devices.

10. The base station according to claim 8, wherein the circuitry designates two or more wireless communication devices as recipients of requests for measurement of radio conditions and reporting of measurement information in different frequency bands, and integrates radio condition measurement information of the respective frequency bands reported from the two or more wireless communication devices.

11. The base station according to claim 8, wherein the circuitry transmits the expiration information of the radio condition measurement information stored in the memory to the wireless communication device designated as the recipient of requests.

12. The base station according to claim 5, wherein the circuitry is configured to:
determine whether a plurality of wireless communication devices are to be changed over to a base station or frequency;
determine to which base station or frequency the plurality of wireless communication devices are to be changed over; and
when the circuitry determines that the plurality of wireless communication devices are to be changed over to the determined base station or frequency, transmit the base station or frequency determined to be changed over as radio condition measurement information in association with the identification information.

13. The base station according to claim 5, wherein the circuitry broadcasts the identification information and the radio condition measurement information on a BCCH.

14. The base station according to claim 5, wherein the circuitry intermittently transmits the identification information and the radio condition measurement information by using a dedicated channel.

15. A wireless communication method comprising:
receiving, by circuitry of a wireless communication device, measurement information, which is based on measurement of a radio condition of a transmission from a base station, in association with identification information;
receiving, by circuitry of the wireless communication device, expiration information of the radio condition measurement information from the base station; and
controlling, by the circuitry, communication based on the received measurement information and the received expiration information when the wireless communication device corresponds to the received identification information.

16. A wireless communication method comprising:
storing, in a memory of a base station, identification information and radio condition measurement information in association with each other;
storing, in the memory of the base station, expiration information of the radio condition measurement;
transmitting, by circuitry of the base station to a wireless communication device, the identification information and the radio condition measurement information in association with each other; and
transmitting, by circuitry of the base station to the wireless communication device, the expiration information of the radio condition measurement,
wherein the wireless communication device controls communication based on the radio condition measurement information and the expiration information, when the wireless communication device corresponds to the identification information.

17. A wireless communication system comprising:
a base station including:
a memory configured to:
store identification information and radio condition measurement information in association with each other; and
store expiration information of the radio condition measurement information; and
first circuitry configured to:
transmit the identification information and the radio condition measurement information in association with each other; and
transmit the expiration information of the radio condition measurement information; and
a wireless communication device including second circuitry configured to:
receive the radio condition measurement information, which is based on measurement of a radio condition of a transmission from the base station, in association with the identification information;
receive the expiration information of the radio condition measurement information; and
control communication based on the received radio condition measurement information and the received expiration information, when the wireless communication device corresponds to the received identification information.

18. The wireless communication device according to claim 1,
wherein the measurement information is generated based on the radio conditions measured by another wireless communication device.

* * * * *